J. T. Youart,
Harvester Cutter.
No. 14,980　　　　　　　　　　Patented May 27, 1856.
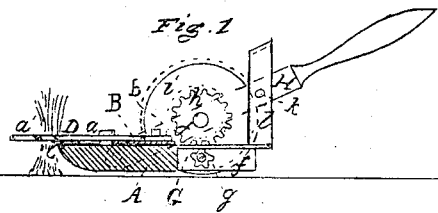
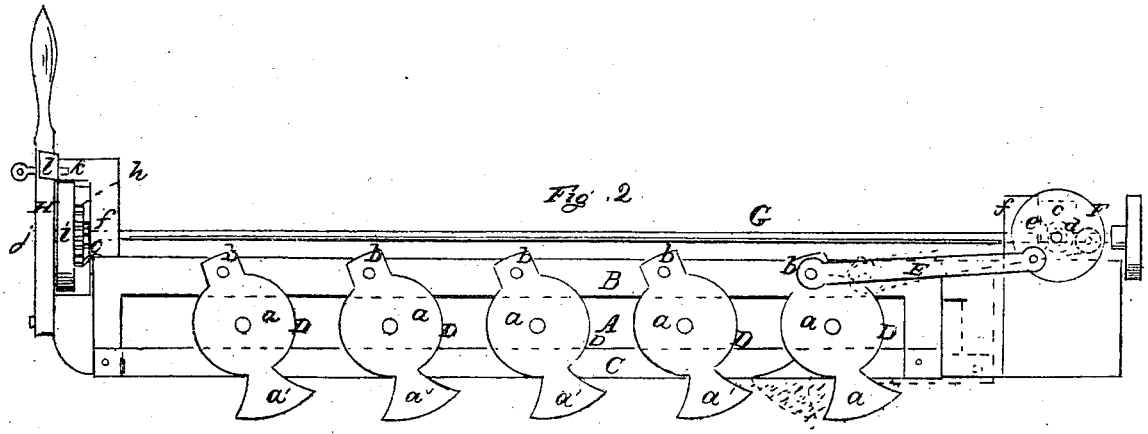

UNITED STATES PATENT OFFICE.

JAMES T. YOUART, OF TROY, OHIO.

IMPROVEMENT IN GRAIN AND GRASS HARVESTERS.

Specification forming part of Letters Patent No. 14,980, dated May 27, 1856.

*To all whom it may concern:*

Be it known that I, JAMES T. YOUART, of Troy, in the county of Miami and State of Ohio, have invented a new and useful Improvement in Grain and Grass Harvesters; and I do hereby declare that the following is a full, clear, and exact description of the same, reference being had to the annexed drawings, making a part of this specification, in which—

Figure 1 is a transverse vertical section of my improvement. Fig. 2 is a plan or top view of the same.

Similar letters of reference indicate corresponding parts in both figures.

My invention consists in the peculiar construction and arrangement of the cutting device, as will be hereinafter fully shown and described.

To enable others skilled in the art to make and use my invention, I will proceed to describe it.

A represents the cutter-bar, which is attached to the main frame of the machine, as usual. The bar and frame are of usual construction, and therefore do not require a minute description.

B represents a rectangular frame, which is placed on the upper surface of the bar A, the frame extending nearly the whole length of the bar. The outer or front strip, C, of the frame B has a cutting-edge and forms the sickle. This strip is made of steel. The other portions of the frame may be made of iron.

D represents what I term "collectors." They are formed of circular plates $a$, pivoted at their centers to the bar A at equal distances apart, and having V-shaped projections $a'$ attached to them at their front ends and square projections $b$ attached to their back ends. The collectors may be made of sheet or cast metal, and the projections $a'\,b$ have not cutting-edges, but are formed square or blunt at right angles with their upper and lower surfaces, the office of the collectors being to draw and press the grass or grain toward the strip or sickle C, as will be hereinafter referred to. The projections $b$ are pivoted to the back strip of the frame B. The projections $a'$ extend beyond the sickle or strip C.

E represents a pitman, one end of which is pivoted to the back strip of the frame B. The opposite end of the pitman is attached by a pivot to a crank-pulley, F, the axis of which passes through a plate, $c$, attached to the back end of the bar A. The axis of the crank-pulley has a bevel-wheel, $d$, upon it, which wheel gears into a corresponding wheel, $e$, on a shaft, G, which is parallel with the bar A, and has its bearings in projections $f\,f$, attached to the back of the bar A. The end of the shaft G, near the crank-pulley, is connected by means of proper gearing with the driving-wheel of the machine, and the opposite end has a pinion, $g$, upon it, which pinion gears into a pinion, $h$, attached to the side of a wheel, $i$, which has its axis $j'$ fitted in a lever, H, one end of which is pivoted to the outer end of the bar A, and the opposite end is secured by a pin, K, to an upright, $l$, attached to one of the projections $f$.

The operation is as follows: As the machine is drawn along, the shaft G is rotated by means of proper gearing from the driving-wheel of the machine, and the crank-pulley F rotated by the bevel-gears $d\,e$, and a reciprocating motion is therefore communicated to the sickle C and a vibrating motion to the V-shaped projections $a'$. The sides of these projections as they vibrate collect the grass or grain and press it against the cutting-edge of the sickle C, and cause it to be cut by the sickle. The sides of the projections are not sharp, but have square edges, the cutting of the grass or grain being done entirely by the sickle. The sides of each projection $a'$ act alternately upon the grass or grain.

The cutting device is simple, easily kept in order, and is not liable to become choked or clogged.

Having thus described my invention, I do not claim separately the reciprocating frame B, with sickle C attached; nor do I claim any form of vibrating cutters separately; but

What I claim as new, and desire to secure by Letters Patent, is—

The cutting device formed of the reciprocating frame B, with the straight-edged sickle C attached, in combination with the square-edged collectors D, connected with the frame B, and having a vibrating movement, the above parts being constructed, arranged, and operating as shown, for the purpose specified.

JAMES T. YOUART.

Witnesses:
ASA YOUART,
JNO. McCOLLOUGH.